March 1, 1966
R. W. HOUSER ETAL
3,237,646
CONTROL DEVICES AND VALVE CONSTRUCTIONS THEREFOR OR THE LIKE
Filed June 12, 1962
5 Sheets-Sheet 1
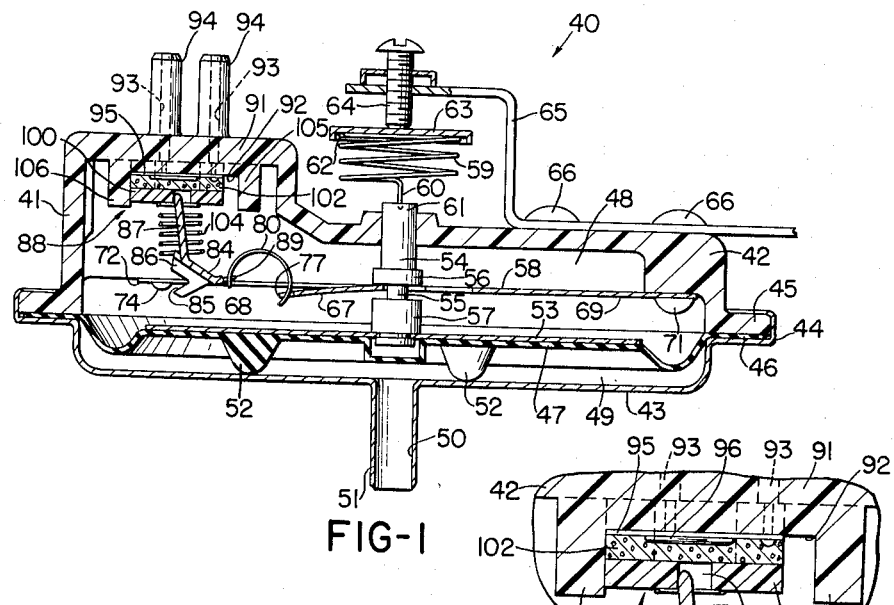
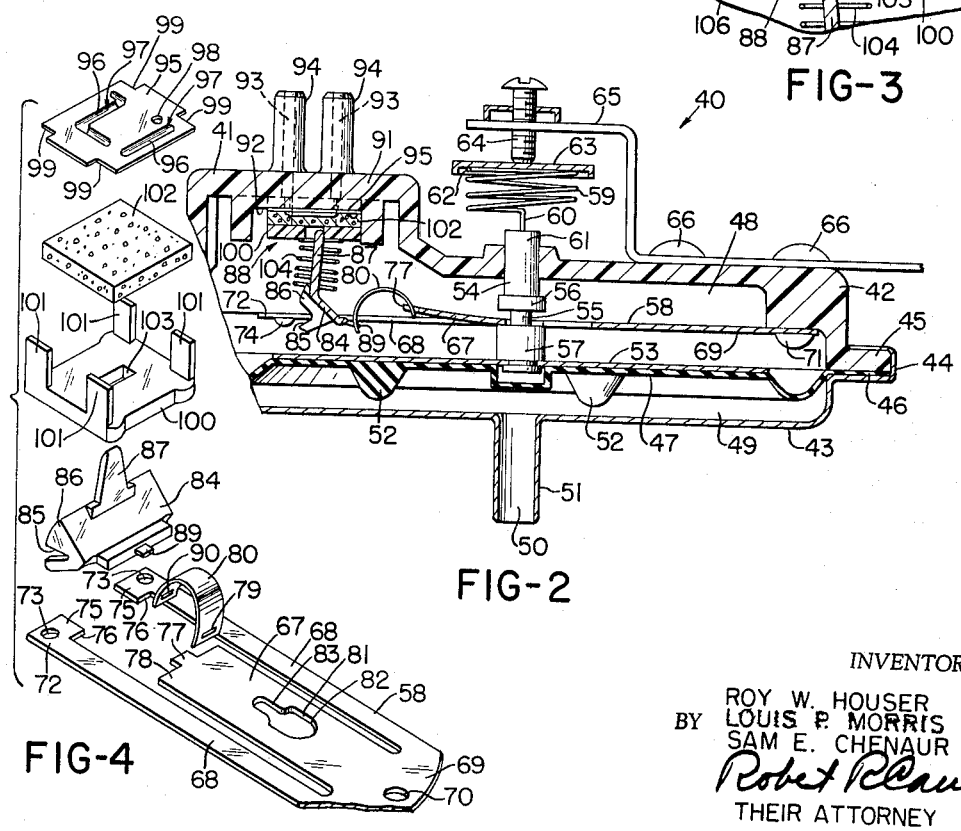
INVENTORS
ROY W. HOUSER
BY LOUIS P. MORRIS
SAM E. CHENAUR
Robert R. Caudor
THEIR ATTORNEY

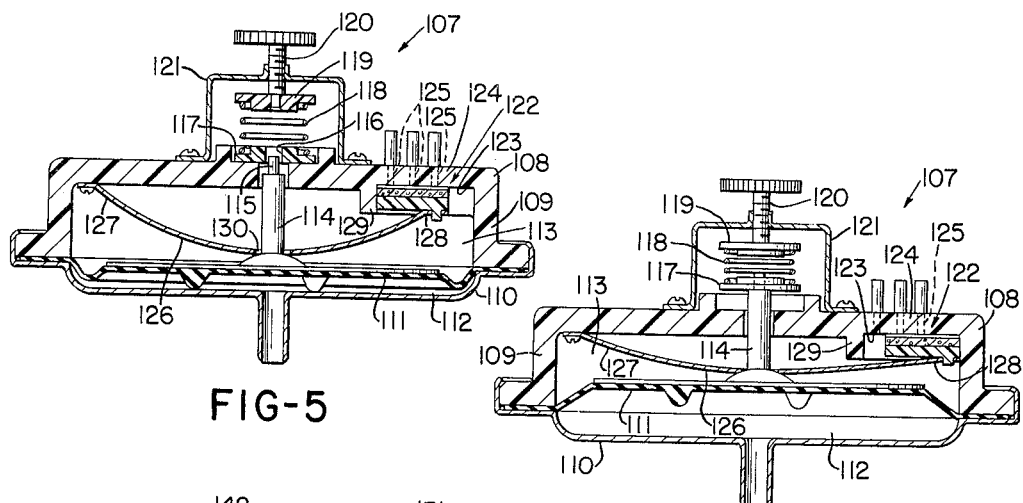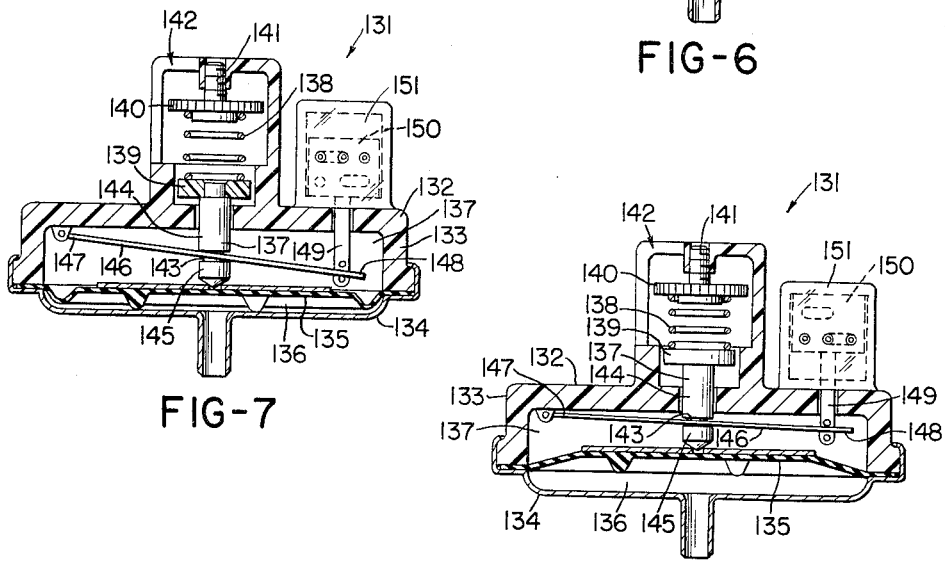

March 1, 1966 R. W. HOUSER ETAL 3,237,646
CONTROL DEVICES AND VALVE CONSTRUCTIONS THEREFOR OR THE LIKE
Filed June 12, 1962
5 Sheets-Sheet 3

INVENTORS
ROY W. HOUSER
BY LOUIS P. MORRIS
SAM E. CHENAUR

Robert R Candor
THEIR ATTORNEY

March 1, 1966 R. W. HOUSER ETAL 3,237,646
CONTROL DEVICES AND VALVE CONSTRUCTIONS THEREFOR OR THE LIKE
Filed June 12, 1962
5 Sheets-Sheet 4
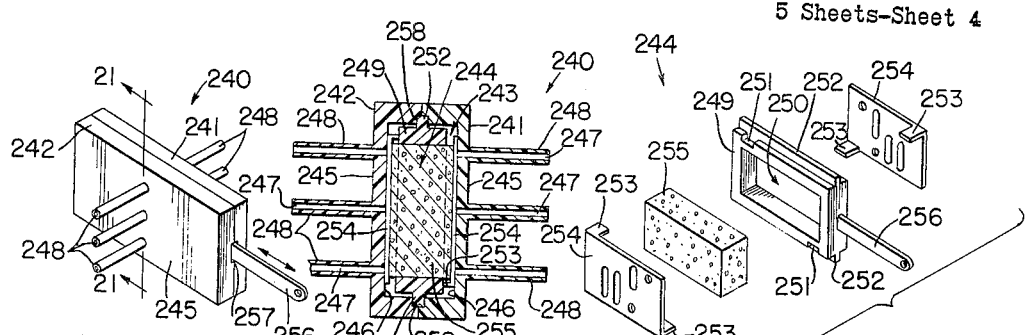
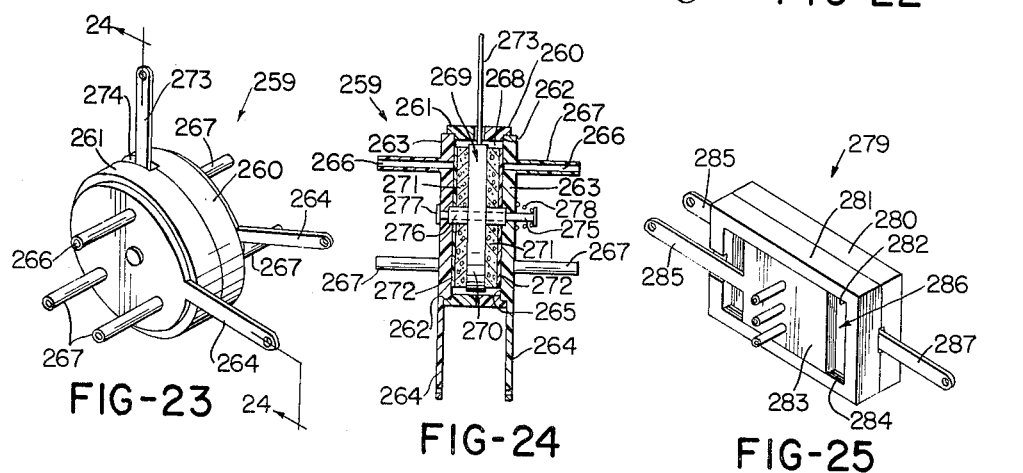
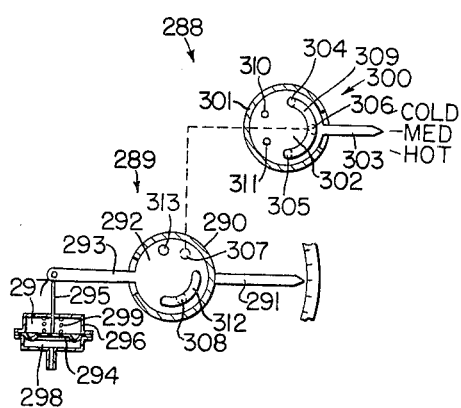
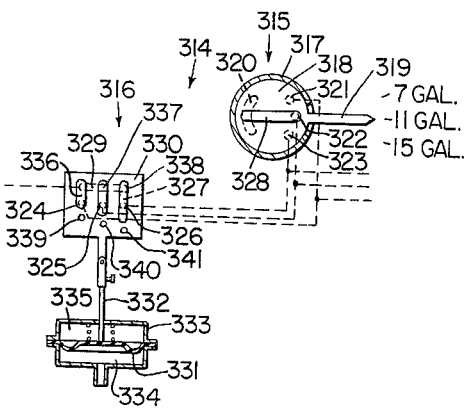
INVENTORS
ROY W. HOUSER
BY LOUIS P. MORRIS
SAM E. CHENAUR
Robert P. Cander
THEIR ATTORNEY

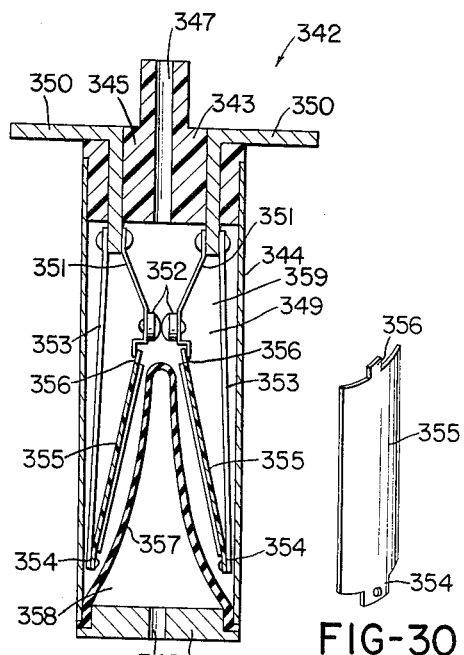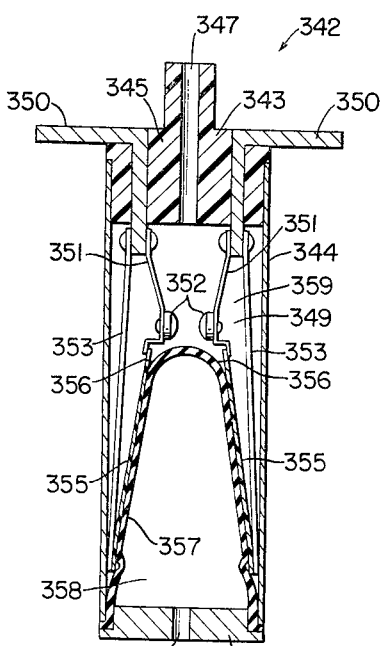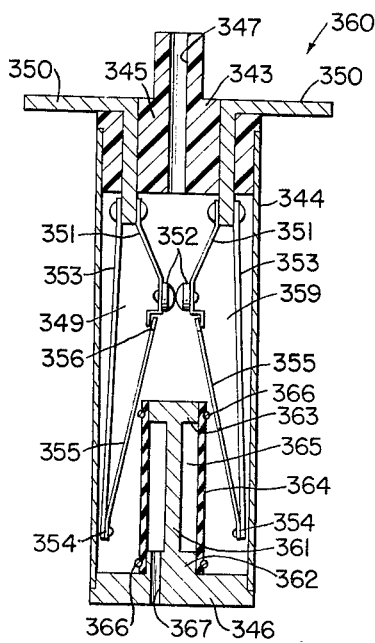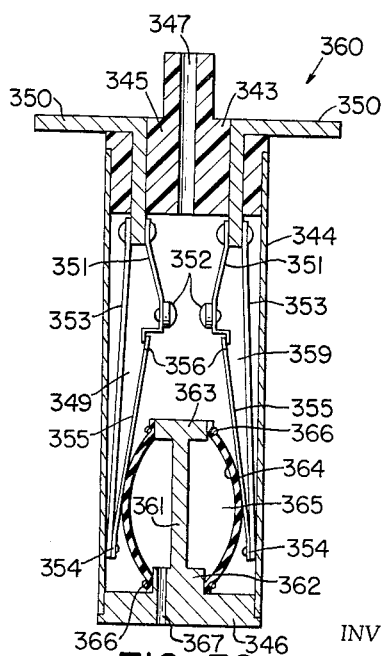

United States Patent Office 3,237,646
Patented Mar. 1, 1966

3,237,646
CONTROL DEVICES AND VALVE CONSTRUCTIONS THEREFOR OR THE LIKE
Roy W. Houser, Orange, Louis P. Morris, Garden Grove, and Sam E. Chenaur, Anaheim, Calif., assignors to Robertshaw Controls Company, Richmond, Va., a corporation of Delaware
Filed June 12, 1962, Ser. No. 202,003
3 Claims. (Cl. 137—625.25)

This invention relates to improved control devices and to improved valve constructions for such control devices or the like, the valve constructions of this invention also being adapted to be utilized separately, if desired.

It is well known that flexible sheets or tapes can be utilized for controlling the interconnection between a plurality of passage means formed in a reading head by selectively varying the position of the tape relative to the reading head.

For example, one prior known valve construction comprises a relatively flexible sheet or tape having blister portions provided therein to form channels that interconnect pairs of passage means in a reading head when the tape is moved relative to the reading head and disposed in sliding engagement therewith.

Usually, one passage means of each pair thereof is interconnected to a vacuum source and the other passage means thereof is interconnected to a vaccum operated device whereby the tape controls the operation of the device depending upon the position of the tape relative to the reading head.

In order to fluid seal the tape against the reading surface of the reading head, a substantially flexible member, such as a sponge-like member or the like, backs up the tape and is placed under compression to compress the tape into sealing engagement with the reading surface of the reading head.

In one embodiment of such a prior known tape valve, the sponge-like member is stationary and the tape is movable relative thereto, whereby the blisters on the tape are forced over the top of the sponge-like member as the tape is moved relative thereto whereby the tape encounters a variable resistance to movement against the reading surface of the reading head.

Sometimes such tape valve members are formed by securing the tape and sponge-like member to a backing member by pressing and securing the extreme outer edges of the tape and sponge-like member to a backing plate or member, whereby an additional pressure is required to flatten out the resultant curved surface of the tape against the flat reading surface of the reading head to provide a proper fluid seal therewith. This additional flattening out pressure increases the surface friction of the tape against the reading surface, whereby the operating force requirements of the prior known valve construction are substantially increased.

Neither the variable resistance nor the high actuating force set forth above are desirable for the accurate and efficient performance of tape-like valve members.

However, according to the teachings of this invention, means are provided for minimizing or substantially eliminating the above disadvantages of prior known tape valves by providing a self seating tape or flexible sheet, i.e., the tape is allowed to seat itself on the reading surface of the reading head with an even pressure obtained from the resilient or sponge-like member backing the same.

This is accomplished in one embodiment of this invention by fixing the spacing between a backing plate and the reading surface of the reading head so that the tape and sponge-like member can be disposed therebetween, the sponge-like member being under slight compression to continually urge the tape into sealing engagement with the reading surface but permitting the tape to be slidable relative to the reading surface.

The tape is operatively interconnected to the backing plate to move in unison therewith in a sliding motion over the reading surface of the reading head while being adapted to move axially relative to the backing plate, i.e., the tape is free to move on an axis disposed perpendicular to the reading surface of the reading head.

Since the distance between the backing plate and the reading surface of the reading head is relatively fixed, the compression of the sponge-like member is fixed and a constant tape pressure is maintained, whereby a minimum tape pressure can be utilized since a slight compression of the sponge-like member is sufficient for fluid sealing the tape against the reading surface of the reading head.

Therefore, the valve construction of this invention provides a minimum of surface friction and a constant surface friction while permitting a simple hand assembly, as will be apparent hereinafter.

Such tape valve members of this invention are readily adapted to be utilized as control devices by themselves or in combination with other structure, as desired.

For example, the tape valve members of this invention can be utilized in combination with water level sensors for controlling the water filling operation of domestic washing machines or the like, as will be apparent hereinafter.

While the various control devices of this invention are adapted to incorporate the above features of the tape valve member, it is to be understood that the control devices of this invention include other novel features that can be utilized in combination thereof or singly, as desired.

Accordingly, it is an object of this invention to provide an improved control device having one or more of the novel features of this invention set forth above or hereinafter shown or described.

Another object of this invention is to provide an improved valve construction for such a control device or the like.

A further object of this invention is to provide an improved pneumatically operated switch construction or the like.

Other objects, uses and advantages of this invention are apparent from a reading of this description, which proceeds with reference to the accompanying drawings forming a part thereof and wherein:

FIGURE 1 is a cross-sectional view of one control device of this invention and illustrates the valve member thereof in one operating position thereof.

FIGURE 2 is a view similar to FIGURE 1 and illustrates the valve member thereof in another operating position thereof.

FIGURE 3 is an enlarged, fragmentary, cross-sectional view of a portion of the control device illustrated in FIGURE 1 to illustrate the lost motion connection thereof.

FIGURE 4 is an exploded, perspective view of various parts of the control device illustrated in FIGURE 1.

FIGURE 5 is a cross-sectional view of another control device of this invention and illustrates the valve member thereof in one operating position thereof.

FIGURE 6 is a view similar to FIGURE 5 and illustrates the valve member thereof in another operating position thereof.

FIGURE 7 is a cross-sectional view illustrating another control device of this invention and illustrates the valve member thereof in one operating position thereof.

FIGURE 8 is a view similar to FIGURE 7 and illustrates the valve member thereof in another operating position thereof.

FIGURE 20 is a perspective view of another valve construction of this invention.

FIGURE 21 is a cross-sectional view taken on line 21—21 of FIGURE 20.

FIGURE 22 is an exploded, perspective view illustrating the valve member of the valve construction of FIGURE 20.

FIGURE 23 is a perspective view of another valve construction of this invention.

FIGURE 24 is a cross-sectional view taken on line 24—24 of FIGURE 23.

FIGURE 25 is a perspective view of another valve construction of this invention.

FIGURES 26 and 27 are schematic views illustrating the use of various valve constructions of this invention in various combinations thereof.

FIGURE 28 is a cross-sectional view illustrating an improved switch construction of this invention, the switch construction being in one operating position thereof.

FIGURE 29 is a view similar to FIGURE 28 and illustrates the switch construction in another operating position thereof.

FIGURE 30 is a perspective view of one of the parts of the switch construction of FIGURE 28.

FIGURE 31 is a view similar to FIGURE 28 and illustrates another switch construction of this invention, the switch construction being in one operating position thereof.

FIGURE 32 is a view similar to FIGURE 31 and illustrates the switch construction in another operating position thereof.

Figure 9:
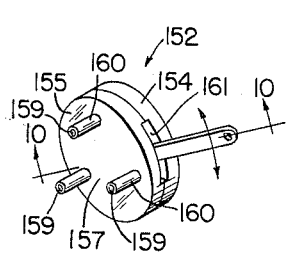
FIGURE 9 is a perspective view and illustrates a valve construction of this invention.

While the various features of this invention are hereinafter described as being utilized in particular control devices and applications thereof, it is to be understood that the various features of this invention can be utilized singly or in any combination thereof to provide other devices, as desired.

Therefore, this invention is not to be limited to only the embodiments illustrated in the drawings, because the drawings are merely utilized to illustrate some of the wide variety of uses of this invention.

Referring now to FIGURES 1–4, an improved control device of this invention is generally indicated by the reference numeral 40 and is adapted to control the water filling operation of a domestic washing machine or the like.

The control device 40 comprises a casing or housing 41 formed by a pair of substantially cup-shaped housing members 42 and 43 secured together by having an annular flange 44 of the housing member 43 crimped around an annular flange 45 of the housing member 42, the housing members 42 and 43 sandwiching the outer periphery 46 of a flexible diaphragm 47 therebetween.

The flexible diaphragm 47 divides the interior of the casing 41 into two compartments 48 and 49, the compartment 49 being interconnected to the exterior of the casing 41 by a passage means 50 formed in a tubular extension 51 adapted to be secured to a suitable conduit or the like for a purpose hereinafter described.

The diaphragm 47 has a plurality of downwardly extending projections 52 to limit downward movement of the diaphragm 47 from the position illustrated in FIGURE 1 and carries a backing plate 53 secured to a transversely movable member or stem 54.

The stem 54 has a reduced portion 55 disposed between a pair of enlarged portions 56 and 57 thereof to provide a lost motion connection between the stem 54 and a spring member 58 in a manner hereinafter described.

The diaphragm 47 is normally urged to the position illustrated in FIGURE 1 by a compression spring 59 having one end 60 thereof secured to or engaging the free end 61 of the stem 54, the free end of the stem 54 projecting outwardly through the housing member 42. The other end 62 of the spring 59 engages a retainer 63 disposed in engagement with an adjusting screw 64 carried by a bracket 65 secured to the casing 41 by a plurality of rivets 66 or the like.

In this manner, the adjusting screw 64 can vary the compression force of the spring 59 tending to urge the diaphragm 47 downwardly to adjust the control device 40 to be responsive to varying liquid levels in a manner hereinafter described.

The spring member 58, as illustrated in FIGURE 4, is suitably stamped or cut to define a central leg 67 and a pair of outer longer legs 68, the legs 67 and 68 being integrally joined at the end 69 of the spring member 58.

The end 69 of the spring member 58 is provided with a suitable aperture 70, whereby the spring member 58 is adapted to be secured in the compartment 48 of the casing 41 by a fastening member 71, as illustrated in FIGURES 1 and 2.

The free ends 72 of the outer legs 68 of the spring member 58 are provided with apertures 73 passing therethrough, whereby the free ends 72 of the legs 68 are adapted to be secured to the casing 41 by fastening members 74 in the manner illustrated in FIGURES 1 and 2.

In this manner, the central leg 67 is mounted in cantilevered fashion in the chamber 48 of the casing 41 for a purpose hereinafter described.

The free ends 72 of the outer legs 68 of the spring member 58 have inwardly turned flanges 75 providing fulcrum surfaces or edges 76 in a manner hereinafter described.

The central leg 67 of the spring member 58 has a projection 77 extending outwardly from the free end 78 thereof, the projection 77 being adapted to be received in a slot 79 in a C-shaped spring 80 for a purpose hereinafter described.

The central leg 67 of the spring member 58 is provided with a slot 81 passing therethrough intermediate the ends thereof, the slot 81 having an enlarged portion 82 adapted to readily receive the stem 54 therethrough and has a smaller portion 83 adapted to only receive the reduced portion 55 of the stem 54 in the manner illustrated in FIGURE 1 whereby the stem 54 is adapted to move the leg 67 upwardly or downwardly upon engagement thereof by the enlarged portions 57 and 56 of the stem 54.

Therefore, because the reduced section 55 of the stem 54 separates the enlarged portions 56 and 57 thereof a desired distance, a lost motion connection is provided between the stem 54 and the spring leg 67.

A movable member or bell crank 84 is provided with outwardly extending notches 85 in opposed lugs or ears 86 thereof whereby the movable member 84 is adapted to receive the fulcrum edges 76 of the legs 68 of the spring member 58 in the notches 85 thereof to permit the movable member 84 to pivot relative to the fulcrum edges 76 for a purpose hereinafter described.

The movable member 84 has an outwardly extending projection 87 adapted to actuate a valve member 88 of this invention in a manner hereinafter described, the movable member 84 having another projection 89 adapted to be received in slot 90 formed in the other end of the C-shaped spring 80 whereby the C-shaped or roll spring 80 holds the movable member 84 against the fulcrum edges 76 and is, in turn, held to the spring member 58 in the manner illustrated in FIGURES 1 and 2.

When the pressure differential between the compartments 49 and 48 of the casing 41 is such that the spring means 59 is adapted to move the diaphragm 47 to the position illustrated in FIGURE 1, the projection 87 of the movable member 84 is pivoted to the left as illustrated in FIGURE 1.

However, as the pressure in the chamber 49 increases over the pressure in the chamber 48 an amount sufficient to cause the diaphragm 47 to move upwardly in opposition to the force of the compression spring 59, the enlarged portion 57 of the stem 54 subsequently engages the under surface of the central leg 67 of the spring member 58 and flexes the same upwardly causing the C-shaped spring 80 to roll in a counterclockwise direction until the projection 77 on the leg 67 is above the projection 89 on the movable member 84 whereby the C-shaped spring 80 snaps in a counterclockwise direction to cause the movable member 84 to rotate with a snap action in a clockwise direction as illustrated in FIGURE 2.

Conversely, when the diaphragm 47 moves downwardly from the position illustrated in FIGURE 2, the C-shaped spring 80 subsequently snaps the movable member 84 in a counterclockwise direction back to the position illustrated in FIGURE 1 when the projection 77 on the central leg 67 moves below the projection 89 on the movable member 84.

Therefore, it can be seen that the movable member 84 is pivoted about the fulcrum edges 76 with a snap action depending upon the position of the diaphragm 47 relative to the casing 41.

Such movement of the movable member 84 causes movement of the valve member 88 of this invention for a purpose hereinafter described.

The casing 41 of the control device 40 carries a reading head 91 formed integrally therewith or separately and attached thereto, as desired.

The reading head 91 has a flat reading surface 92 disposed in the chamber 48 and is interrupted by a plurality of passage means 93 respectively passing through tubular extensions 94 adapted to be interconnected to conduits leading to various devices.

In particular, certain of the passages 93 may be interconnected to a vacuum source while other of the passages 93 may be interconnected to various vacuum operated control devices.

Therefore, when the vacuum source is interconnected to a particular vacuum operated control device by a bridging of the space between the appropriate passages 93 at the reading surface 92 by the valve member 88 of this invention, the vacuum source can operate the vacuum operated control device in a manner conventional in the art.

The valve member 88 controls the interconnection between the various passages 93 whereby various passages 93 are interconnected together when the valve member 88 is in the position illustrated in FIGURE 1 and other passages 93 are interconnected together when the valve member 88 is disposed in the position illustrated in FIGURE 2.

For example, should the control device 40 be utilized as a flow control device for a domestic washing machine or the like, the valve member 88 interconnects the appropriate passages 93, when in the position illustrated in FIGURE 1, to call for a demand of water to be fed to the washing machine. However, when the control device 40, in a manner hereinafter described, determines that the liquid level in the washing machine is at the desired level, the valve member 88 is moved to the position illustrated in FIGURE 2 to terminate the flow of water to the washing machine.

The valve member 88 comprises a flexible sheet or tape 95 having blister portions 96 formed therein to define outwardly facing channels 97 utilized to bridge the spacing between selected passage means 93 in the reading surface 92 when the valve member 88 is in a particular position thereof.

The flexible sheet or tape 95 is provided with one or more apertures 98 and a plurality of notches 99 at the corners thereof for a purpose hereinafter described.

A backing member 100 is adapted to be operatively interconnected to the flexible sheet 95 by having a plurality of outwardly directed tab means 101 adapted to respectively be received in the slots 99 of the flexible sheet 95 when the same are disposed in aligned relation as illustrated in FIGURES 1 and 2 whereby the flexible sheet 95 and backing member 100 are interconnected together to move in unison when the same slide relative to the reading surface 92 of the reading head 91.

However, the flexible sheet 95 is adapted to move axially relative to the backing member 100 along an axis disposed perpendicular to the reading surface 92 for a purpose hereinafter described.

A flexible member 102, such as a porous, sponge-like, resilient material or the like, is disposed between the flexible tape 95 and the backing member 100 for a purpose hereinafter described.

The backing member 100 is provided with an elongated slot 103 passing therethrough and adapted to receive the projection 87 of the movable member 84 in the manner illustrated in FIGURE 3.

The valve member 88 is assembled together in the above manner and is urged toward the reading surface 92 of the reading head 91 by a compression spring 104 disposed between the movable member 84 and the backing member 100, the spring 104 encompassing the projection 87 of the movable member 84.

In this manner, the compression spring 104 compacts the backing plate 100, resilient or flexible member 102 and flexible sheet 95 against the reading surface 92 of the reading head 91 with a constant force so that the backing member 100 is disposed spaced from the reading surface 92 a predetermined distance whereby the flexible member 102 is compressed between the backing member 100 and the flexible sheet 95 to urge the flexible sheet 95 into sealing relation with the reading surface 92 of the reading head 91 with a substantially constant and minimum force to provide a sealing relation between the flexible sheet 95 and the reading surface 92.

Therefore, it can be seen that the flexible sheet 95 is disposed or urged into engagement with the reading surface 92 of the reading head 91 with a substantially constant pressure which is at a minimum to provide a sealing relation with the reading surface 92 to minimize the friction between the sheet 95 and the reading surface 92 to permit the valve member 88 to be moved relative to the reading surface 92 in a relatively easy and effective manner.

This feature is accomplished by having the flexible sheet 95 splined to the backing member 100 to permit the same to be slidable in unison relative to the reading surface 92 while permitting the flexible sheet 95 to be axially movable relative to the backing member 100 along an axis disposed perpendicular to the reading surface 92.

As illustrated in FIGURE 3, the projection 87 of the movable member 84 is received in the slot 103 of the backing plate or member 100 in such a manner that the projection 87 of the movable member 84 does not completely fill the slot 103 whereby the movable member 84 is adapted to move relative to the valve member 88 before the movable member 84 causes movement of the valve member 88 in a like direction.

This lost motion connection between the valve member 88 and the movable member 84 permits the movable member 84 to be snapped in the desired direction by the C-shaped spring 80 in the manner previously described to cause the movable member 84 to gain momentum before the same engages the backing member 100 to cause the valve member 88 to move in unison therewith.

In this manner, the relative movement between the movable member 84 and the valve member 88 permits the movable member 84 to gain momentum after it is snapped over to apply a substantial amount of pressure on the valve member 88 to shift it to a new position thereof to overcome the friction between the valve member 88 and the reading surface 92 of the reading head 91 and to overcome the varying vacuum conditions which may be imposed on the flexible sheet 95 because of differences in vacuum or suction sources which may be inter-connected to different control devices 40.

The operation of the control device 40, when being utilized as a flow control device for a domestic washing machine or the like, will now be described.

When no water is in the washing machine or the like, the control device 40 is disposed in the position illustrated in FIGURE 1 wherein the valve member 88 interconnects the appropriate passages 93 of the reading head 91 to cause appropriate valve structure to permit water to flow to the washing machine when the washing machine is turned on and in the "fill" position thereof.

For example, one of the channels 97 of the flexible sheet 95, when disposed in the position illustrated in FIGURE 1, may interconnect a vacuum source passage 93 to a control device passage means 93 to impose a vacuum on the vacuum operated device and cause the same to open a valve member to allow water to flow to the domestic washing machine or the like.

As the liquid level in the washing machine increases, the liquid level progressively increases the compressive action on the air trapped in the chamber 49 of the control device 40 until the pressure differential between the chambers 49 and 48 thereof exceeds the force of the compression springs 59 and permits the diaphragm 47 to move upwardly.

When the diaphragm 47 moves upwardly, the enlarged portion 57 of the stem 54 eventually comes into contact with the central leg 67 of the spring member 58 and causes the same to move upwardly therewith.

When the projection 77 of the leg 67 of the spring member 58 moves above the projection 89 of the movable member 84, the C-shaped spring 80 snaps to the position illustrated in FIGURE 2 to cause the movable member 84 to snap in a clockwise direction, the spring 80 snapping the movable member 84 when the water has reached the level selected by the adjusting screw 64 in a manner well known in the art.

As the movable member 84 is initially snapped in a clockwise direction, the movable member 84 gains momentum before the same engages the right-hand wall of the slot 103 of the backing member 100 to cause sliding movement of the valve member 88 to the right, movement of the valve member 88 to the right being limited by a stop means 105 of the casing 41.

When the valve member 88 is snapped to the position illustrated in FIGURE 2, one of the channels 97 thereof is adapted to interconnect the vacuum source to another control device to cause further operation of the washing machine in the desired cycle thereof while one of the apertures 98 thereof is interconnected to the passage means leading to the vacuum operated device controlling the flow of water to the washing machine to permit air to flow through the porous flexible member 102 to the vacuum operated device which closes the valve means and terminates the flow of water to the washing machine.

When the liquid level in the washing machine decreases, such as during an emptying cycle of the washing machine or the like, the pressure differential between the chambers 49 and 48 of the casing 41 decreases whereby the force of the compression spring 59 tends to move the diaphragm 47 downwardly whereby the valve member 88 is subsequently snapped to the left as illustrated in FIGURE 1, movement of the valve member 88 to the left being limited by a stop member 106 of the casing 41.

Therefore, it can be seen that the control device 40 of this invention provides improved means for operating a slide valve member 88 by providing a lost motion connection between the movable member 84 and the valve member 88 to overcome friction and various vacuum conditions tending to hold the valve member 88 in a particular position thereof.

Further, the valve member 88 of this invention is so constructed and arranged that the flexible tape 95 thereof is held into sealing relation with the reading surface 92 of the reading head 91 by a substantially constant force which is at a minimum to provide a sealing relation between the tape 95 and the reading surface 92 so that the amount of friction to be overcome to move the valve member 88 is held to a minimum.

While one form of control device has been illustrated and described above for being particularly adaptable for controlling the flow of water to a domestic washing machine or the like, other control devices of this invention can be utilized and incorporate various features of this invention as set forth above.

In particular, reference is made to FIGURES 5 and 6 wherein another control device of this invention is generally indicated by the reference numeral 107 and comprises a casing 108 formed from a pair of cup-shaped housing members 109 and 110 secured together in the manner previously described and sandwiching a flexible diaphragm 111 therebetween, the diaphragm 111 dividing the interior of the casing 108 into two compartments 112 and 113.

The diaphragm 111 carries a stem or transversely movable member 114 having a reduced end 115 adapted to be received in a bore 116 of a retainer 117, the retainer 117 normally being urged downwardly against the casing 108 by a compression spring 118 disposed between the retainer 117 and another retainer 119 carried by an adjusting screw 120. The adjusting screw 120 is carried by a bracket 121 secured to the casing 108.

A valve member 122, similar to the valve member 88 previously described, is dispsed in sliding engagement against a reading surface 123 of a reading head 124 formed integrally with the casing 108 or separately and secured thereto in any suitable manner, the reading surface 123 being interrupted by a plurality of passage means 125.

A bowed leaf spring 126 is disposed in the chamber 113 of the casing 108 and has one end 127 thereof secured to the casing 108 and the other end 128 thereof secured to the valve member 122.

When the diaphragm 111 is disposed in the position illustrated in FIGURE 5, the leaf spring 126 is bowed to the position illustrated in FIGURE 5 and pulls the valve member 122 to its left-hand position against a stop means 129 of the casing 108.

The stem 114 of the diaphragm 111 passes through an aperture 130 formed in the leaf spring 126 intermediate the ends 127 and 128 thereof, whereby upward movement of the diaphragm 111 in opposition to the force of the leaf spring 126 and the compression spring 118 causes the leaf spring 126 to flatten out in the manner illustrated in FIGURE 6 and cause the valve member 122 to slide to the right relative to the reading surface 123 of the reading head 124 to interconnect different passage means 125 in the manner previously described for the reasons previously described.

Therefore, it can be seen that the valve member of this invention can be utilized with the valve movement actuating means of the control device 107 illustrated in FIGURES 5 and 6 to provide a sequence of operations in substantially the same manner as the control device 40 previously described.

Another control device of this invention is generally indicated by the reference numeral 131 in FIGURES 7 and 8 and comprises a casing or housing 132 formed by a pair of cup-shaped housing members 133 and 134 secured together in a manner similar to the housing 41 previously described, the housing members 133 and 134 sandwiching a diaphragm 135 therebetween to divide the interior of the casing 132 into two compartments 136 and 137.

An operating stem or transversely movable member 137 is either carried by the diaphragm 135 or disposed in engagement therewith by a compression spring 138 disposed between a retainer 139 carried by the stem 137 and a retainer 140 carried on an adjusting screw 141 carried by the casing member 133, the casing member 133 being cut away at 142 to provide access to the retainer 140 to adjust the force of the compression spring 138 tending to urge the diaphragm 135 downwardly for the purpose previously described.

The stem 137 has a reduced portion 143 separating enlarged portions 144 and 145 to provide a lost motion connection similar to the section 55 of the stem 54 previously described.

A substantially straight lever 146 has one end 147 thereof pivoted to the casing 132 and the other end 148 thereof operatively interconnected to an arm 149 of a valve member 150 of this invention, the valve member 150 being formed in substantially the same manner as the valve member 88 previously described or in a manner similar to other valve members of this invention hereinafter described.

The valve member 150 is adapted to be moved relative to a reading surface of a reading head 151 carried by the casing 132 for the reasons previously described.

The lever 146 is operatively interconnected to the reduced portion 143 of the stem 137 in substantially the same manner as the central leg 67 of the spring member 58 previously described whereby transverse movement of the stem 137, by movement of the diaphragm 135, causes the lever 146 to pivot about the end 147 thereof and slide the valve member 150 relative to the reading surfaces of the reading head 151 from the position illustrated in FIGURE 7 to the position illustrated in FIGURE 8 to interconnect various passages formed in the reading head 151 in the manner previously described and for the reasons previously described.

Therefore, it can be seen that this invention provides various control devices which are adapted to utilize valve members of this invention in such a manner that each control device is readily adaptable to be utilized as a flow control device for a domestic washing machine or the like.

Figure 10:
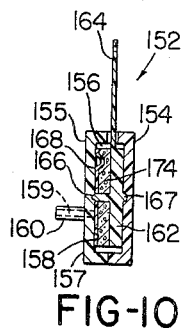
FIGURE 10 is a cross-sectional view taken on line 10—10 of FIGURE 9.
Figure 11:
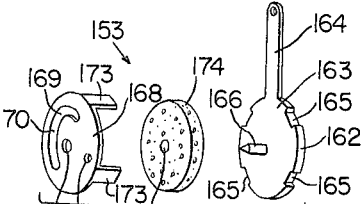
FIGURE 11 is an exploded, perspective view of the valve member of the valve construction illustrated in FIGURE 9.

Referring now to FIGURES 9, 10 and 11, an improved valve construction of this invention is generally indicated by the reference numeral 152 and is adapted to utilize a valve member 153 of this invention having various features similar to the valve members 88, 122 and 150 previously described.

The valve construction 152 comprises a pair of cup-shaped casing members 154 and 155 suitably secured together to define a compartment 156 therebetween adapted to receive the valve member 153 of this invention.

One of the casing members 154 or 155 can be utilized as a reading head 157 having a reading surface 158 interrupted by a plurality of passage means 159 respectively passing through tubular extensions 160 extending outwardly from the casing or reading head 157 and being adapted to be interconnected to various conduits as desired.

The casing members 154 and 155 are so constructed and arranged that the same define an arcuate slot 161 therebetween to be utilized in a manner hereinafter described.

The valve member 153 of the valve construction 152 comprises a plate-like backing member 162 having a circular portion 163 integrally interconnected to an outwardly extending lever portion or arm 164, the outer periphery of the circular portion 163 of the backing member 162 being interrupted by a plurality of notches 165 for a purpose hereinafter described.

The circular portion 163 of the backing member 162 has a pin 166 projecting from one side thereof and a shorter pin 167, FIGURE 10, projecting from the other side thereof, the pins 166 and 167 respectively being adapted to be received in suitable recesses formed in the casing members 154 and 155 to permit the backing member 162 to be rotated relative to the reading head 157 upon movement of the lever arm 167 projecting out through the slot 161 in the manner illustrated by the arrows in FIGURE 9.

The valve member 153 includes a flexible sheet 168 having at least one blister portion 169 providing an outwardly facing channer 170 for the purpose previously described, the flexible sheet 168 having at least one bleed aperture 171 passing therethrough and having a central aperture 172 adapted to receive the pin 166 of the backing member 162 when the same are assembled together in the manner illustrated in FIGURE 10.

The flexible sheet 168 of the valve member 153 has a plurality of tab means 173 projecting rearwardly therefrom and being adapted to be respectively received in the slots 165 of the backing member 162, whereby the flexible sheet 168 and backing member 162 are adapted to be splined together to cause the same to rotate in unison while permitting the flexible sheet 168 to be axially movable relative to the backing member 62 along an axis disposed perpendicular to the reading surface 158 of the reading head 157.

A flexible member 174, such as a sponge-like porous member, has an aperture 175 passing therethrough to receive the pin 166 of the backing member 162, whereby the backing member 162, flexible member 174 and flexible sheet 168 can be assembled together in the manner illustrated in FIGURE 10 to provide the valve member 153.

When the valve member 153 is disposed in the chamber 156 of the casing members 154 and 155, the backing member 162 is held in a predetermined spaced relation from the reading surface 158, whereby the flexible member 174 is placed under enough compression to urge the flexible sheet 168 into sealing relation with the reading surface 158 of the reading head 157 without excessive friction therebetween, whereby the resilient member 174 urges the flexible sheet 168 against the reading surface 158 with a constant pressure which is at a minimum to provide a fluid sealing relation between the sheet 168 and the reading surface 158.

Therefore, it can be seen that the valve member 153 is adapted to be moved relative to the reading surface 158 upon movement of the arm 164 of the backing member 162 in the manner illustrated by the arrows in FIGURE 9 to interconnect various passage means 159 by the blister portion 169 in the manner previously described.

While the embodiment of the valve member 153 illustrates that the flexible sheet 168 has the tab means 173 to provide a splined connection with the backing plate 162 to permit rotational movement of the valve member 153 relative to the reading surface 158 of the reading head 157, it is to be understood that the backing plate 162 could be splined to the flexible sheet 168 if desired.

Figure 12:
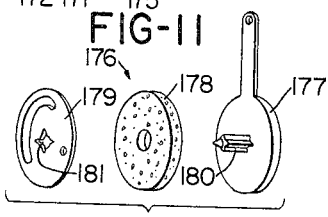
FIGURE 12 is a view similar to FIGURE 11, illustrating another valve member that can be utilized with the valve construction of FIGURE 9.

In particular, reference is made to FIGURE 12 wherein another valve member 176 of this invention comprises a backing plate 177, a flexible member 178 and a flexible sheet 179 formed in substantially the same manner as the backing plate 162, flexible member 174 and flexible sheet 168 previously described.

However, the backing plate or member 177 has an outwardly directed gear-shaped projection 180 adapted to be received in a central notch 181 formed in the flexible sheet 179 to spline the backing plate 177 to the flexible sheet 179 to permit the same to rotate in unison while permitting axial movement between the flexible sheet 179 and the backing plate 177 for the reasons previously described.

While the valve construction 152 is illustrated as having rotatable valve means, it is to be understood that the various features of this invention can be utilized to provide a valve construction wherein the valve member is reciprocated relative to the reading surface of a reading head.

Figures 13, 14:
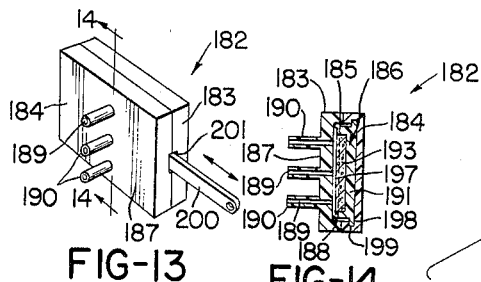
FIGURE 13 is a perspective view of another valve construction of this invention.
FIGURE 14 is a cross-sectional view taken on line 14—14 of FIGURE 13.
Figure 15:
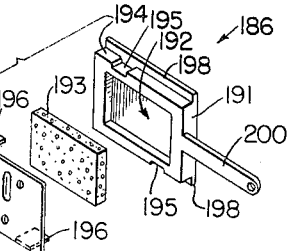
FIGURE 15 is an exploded, perspective view illustrating the valve member of the valve construction of FIGURE 13.

In particular, reference is made to FIGURES 13–15 wherein another valve construction of this invention is generally indicated by the reference numeral 182 and comprises a pair of casing members 183 and 184 suitably secured together to define a compartment 185 therebetween to receive a valve member 186 of this invention, the casing member 184 comprising a reading head 187 having a reading surface 188 interrupted by a plurality of passage means 189 extending through tubular extensions 190 in the manner previously described.

The valve member 186 includes a backing member or plate 191 having a recess 192 interrupting one side thereof and adapted to receive part of a resilient member 193 formed in a substantially rectangular form.

The peripheral edge 194 of the backing plate 191 is provided with obliquely disposed notches 195 to respectively receive outwardly extending tab means 196 on a flexible sheet or tape 197.

A pair of opposed flanges 198 extend outwardly from the backing plate 191 and are respectively adapted to be received in slots 199 formed in the casing member 183 to permit the backing member 191 to be reciprocal relative thereto.

When the valve member 186 is assembled together in the manner illustrated in FIGURE 14, the backing plate 181 is disposed spaced from the reading surface 188 of the reading head 187 a predetermined distance, whereby the resilient member 193 is placed under slight compression to continually urge the flexible sheet 197 into sealing relation with the reading surface 188 with a constant pressure which is only as sufficient to provide a fluid seal between the sheet 197 and the reading surface 188 without creating excess friction therebetween.

The backing plate 191 has an arm 200 extending outwardly therefrom which is adapted to protect outwardly through a slot 201 formed between the casing members 183 and 184 in the manner illustrated in FIGURE 3 whereby the valve member 186 is adapted to be reciprocated relative to the reading surface 188 by moving the arm 200 in the direction indicated by the arrows in FIGURE 13.

Figure 16:
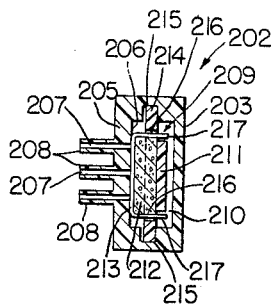
FIGURE 16 is a cross-sectional view similar to FIGURE 14 and illustrates another embodiment of this invention.

While the valve member 186 illustrated in FIGURE 15 has the tab means 196 of the flexible sheet 197 received in outwardly facing notches 195 of the backing plate 191, it is to be understood that the flexible sheet 197 could be splined thereto in any of the manners previously described or in the manner illustrated in FIGURE 16.

In particular, another valve construction of this invention is generally indicated by the reference numeral 202 in FIGURE 16 and comprises a housing 203 provided with a reading head 205 having the reading surface 206 thereof interrupted by a plurality of passage means 207 extending through tubular extensions 208 in the manner previously described.

A reciprocating valve member 209 is disposed in the compartment 210 defined in the casing 203 and comprises a backing member 211, a resilient member 212 and a flexible sheet 213, the backing member 212 having outwardly extending flanges 214 received in slots or recesses 215 of the casing 203.

The backing member 211 has a plurality of slots 216 formed therethrough and the flexible sheet 213 has rearwardly extending tab means 217 respectively passing through the slots 216 in the backing member 212 whereby the backing member 212 is splined to the flexible sheet 213 to permit the same to reciprocate in unison therewith while permitting the flexible sheet 213 to move axially relative to the backing member 212 along an axis disposed perpendicular to the reading surface 206 of the reading head 205 for the reasons previously described.

While the valve constructions of this invention have been previously described as having a single reading head, it is to be understood that the valve constructions of this invention can be formed in any of the manners previously described and have a plurality of reading heads.

Figures 17, 18:
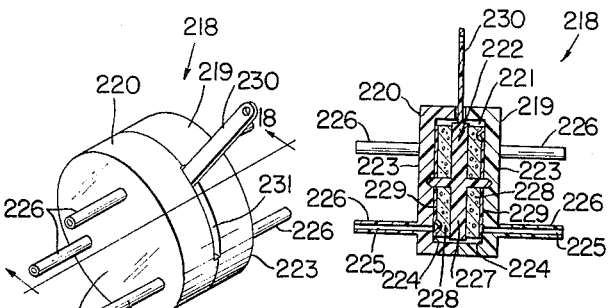
FIGURE 17 is a perspective view of another valve construction of this invention.
FIGURE 18 is a cross-sectional view taken on line 18—18 of FIGURE 17.

In particular, reference is made to FIGURES 17 and 18 wherein another valve construction of this invention is generally indicated by the reference numeral 218 and comprises a pair of casing members 219 and 220 secured together in any suitable manner to define a compartment 221 therebetween receiving a valve member 222 of this invention.

Each casing member 219 and 220 comprises a reading head 223 provided with a reading surface 224 interrupted by a plurality of passage means 225 extending through tubular extensions 226 in the manner illustrated in FIGURE 18.

The value member 222 of this invention comprises a backing member 227, a pair of flexible members 228 disposed on opposite sides thereof and a pair of flexible sheets 229 respectively disposed in sliding engagement with the reading surfaces 224, the flexible members 228 being placed under slight compression when the valve member 222 is disposed in the compartment 221 of the valve construction 218.

The backing plate 227 is adapted to be splined to the flexible sheets 229 in any of the manners set forth in FIGURES 11 and 12 whereby rotational movement of the backing member 222 by the arm 230 projecting out of the arcuate slot 231 between the casing members 219 and 220 causes the flexible sheets 229 to rotate in unison therewith while still permitting the flexible sheets 229 to move axially relative to the backing member 222 along an axis disposed perpendicular to the reading surfaces 224 in the manner previously described for the reasons previously described.

While the valve construction 218 is illustrated as having a lever arm 230 to rotate the valve member 222 relative to the reading heads 223, it is to be understood that the backing member 222 can be rotated through any desired arc or through 360 degrees as desired by other means as desired.

Figure 19:
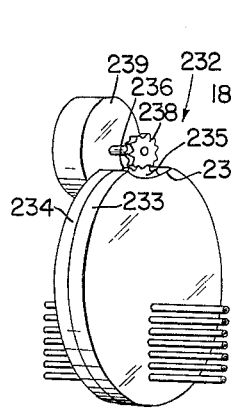
FIGURE 19 is a perspective view of another valve construction of this invention.

In particular, reference is made to FIGURE 19 wherein another valve construction of this invention is generally indicated by the reference numeral 232 and comprises a pair of casing members 233 and 234 suitably secured together and carrying a valve member therebetween, the valve member being formed in substantially the same manner as the valve member 222 previously described but having the backing member 235 thereof provided with a plurality of teeth 236 about the outer periphery thereof whereby the backing member 235 projects outwardly through a cutaway portion 237 of the casing members 233 and 234 and be disposed in meshing relation with a gear 238 suitably driven by a motor means 239 or the like.

In this manner, the casing members 233 and 234 can be respectively utilized as reading heads and the valve member disposed therebetween can be rotated through 360 degrees or any desired arc by the motor means 239 to provide a vacuum program control or the like.

While the valve constructions 218 and 232 have been illustrated as having the valve members thereof rotatable relative to the reading surfaces, it is to be understood that the same can be formed so that the valve members thereof are reciprocable relative to the reading surfaces in the manner illustrated in FIGURES 13–16.

In particular, reference is made in FIGURES 20–22 wherein another valve construction of this invention is generally indicated by the reference numeral 240 and comprises a pair of casing members 241 and 242 suitably secured together to define a compartment 243 therebetween and adapted to receive a valve member 244 of this invention, each casing member 241 and 242 comprising a reading head 245 having a reading surface 246 interrupted by a plurality of passage means 247 extending through tubular extensions 248 in the manner previously described.

The valve member 244 of the valve construction 240 is illustrated in FIGURE 22 and comprises a movable member 249 formed in substantially the same manner as the backing plate 191 previously described except that an opening 250 passes completely through the movable member 249 for a purpose hereinafter described, the movable member 249 having obliquely disposed notches 251 disposed on opposite sides of outwardly extending flanges 252 to respectively receive tab means 253 of flexible sheets 254.

A single flexible member 255 is adapted to be disposed in the opening 250 of the movable member 249 whereby each flexible sheet 254 acts as a backing member for the other when the same are assembled in the compartment 243 of the valve construction 240 in the manner illustrated in FIGURE 21 whereby the flexible member 255 is placed under compression to continually urge the flexible sheets 254 into engagement with the reading surfaces 246 of the reading heads 245 with a constant pressure and in an amount sufficient to provide sealing relation therebetween without creating excessive friction.

In this manner, the flexible sheets 254 are splined to moveable member 249 whereby the same reciprocate in unison therewith when the member 249 is reciprocated relative to the reading heads 245 by an arm 256 projecting outwardly through a slot 257 formed between the casing members 241 and 242 in the manner illustrated in FIGURE 20, the flanges 252 of the movable member 249 being received in recesses 258 formed between the secured together casing members 241 and 242 in the manner illustrated in FIGURE 21.

While the movable member 249 of the valve member 244 previously described has been illustrated as having the opening 250 passing completely therethrough whereby only one resilient member 255 is utilized, it is to be understood that the movable member 249 can be made in the same manner as the movable member 191 illustrated in FIGURE 15 herein an opening or recess 192 is formed on each side thereof so that two resilient members must be utilized and the movable member 249 acts as a backing member for each flexible sheet 254 in the manner previously described.

While the various valve constructions of this invention previously described all have the valve members thereof movable relative to the reading heads it is to be understood that the reading heads of this invention can be made movable relative to the valve members, the valve members either being fixed relative to the reading heads or also being movable relative thereto as desired.

In particular, reference is made to FIGURES 23 and 24 wherein another valve construction of this invention is generally indicated by the reference numeral 259 and comprises a pair of casing members 260 and 261 suitably secured together in a manner hereinafter described, each casing member 260 and 261 having a recess 262 formed around the inner periphery thereof and adapted to receive a substantially circular reading head 263 whereby each reading head 263 is adapted to be rotated relative to the secured casing members 260 and 261 by movement of an arm 264 thereof.

Each reading head 263 has a reading surface 265 interrupted by a plurality of passage means 266 respectively passing through tubular extensions 267 in the manner previously described.

The reading heads 263, in combination with the casing members 260 and 261, define a compartment 268 adapted to receive a valve member 269 of this invention.

The valve member 269 of this invention includes a central backing member 270, a pair of flexible members 271 disposed on opposite sides of the backing member 270 and a pair of flexible sheets 272 disposed in sliding and sealing relation with the reading surfaces 265 of the reading heads 263 in the manner previously described because the resilient members 271 are placed under slight compression.

The flexible sheets 272 are operatively interconnected to the backing member 269 by a splined connection in any of the manners previously described whereby the flexible sheets 272 rotate in unison with the backing member 270 being moved relative to the reading heads 263 by an arm 273 projecting outwardly through a slot 274 formed in the casing members 260 and 261.

A pin 275 extends respectively through the reading heads 263, and the projecting pin means 276 of the backing plate 269 whereby enlarged heads 277 of the pin means 275 are disposed outboard of the reading heads 263.

A compression spring 278 is disposed between one of the reading heads 263 and one of the enlarged heads 277 of the pin means 275 whereby the compression spring 278 urges the reading heads 263 into engagement with the casing members 260 and 261 to hold the valve construction 259 together.

In this manner, the reading heads 263 can be adjusted relative to the valve member 269 by rotating one or more of the reading heads 263 by the arms 264 thereof and, thereafter, the valve member 269 can be moved relative to the reading heads 263 by movement of the arm 273 thereof.

Therefore, it can be seen that the valve construction 259 of this invention can be formed with adjustable reading heads and with a fixed valve member or with a movable valve member, as desired.

While the valve construction 259 previously described has the valve member and reading heads thereof rotatable relative to each other, it is to be understood that the same can be made reciprocable relative to each other in the manner illustrated in FIGURE 25.

In particular, the valve construction illustrated in FIGURE 25 is generally indicated by the reference numeral 279 and comprises a pair of casing members 280 and 281 suitably secured together and respectively having longitudinal slots 282 passing therethrough.

A pair of reading heads 283 are respectively disposed in the slots 282 and have outwardly extending flange means (not shown) received in slots 284 formed in the casing members 280 and 281 whereby the reading heads 283 are adapted to be reciprocated relative to the casing members 280 and 281 by movement of the arms 285 thereof.

A movable valve member 286 is disposed between the reading heads 283 and is adapted to be reciprocated relative thereto by movement of the arm 287 thereof, the valve member 286 being formed in any of the manners previously described to provide a reciprocating valve member.

Therefore, it can be seen that various valve constructions are provided by this invention wherein the flexible sheet of the valve member is urged into sealing relation with the reading surface by a constant pressure supplied by a flexible member, because the backing plate is disposed a predetermined distance from the reading surface, the flexible sheet and backing member being splined together to permit the same to move in unison relative to the reading surface while permitting the flexible sheet to move axially relative to the backing member along an axis disposed perpendicular to the reading surface.

Further, the various valve constructions of this invention permit the valve member to be movable relative to the reading head, the reading head to be movable relative to the valve member, or both the valve member and reading head to be movable relative to each other.

While the various valve constructions of this invention can be utilized in many desired applications thereof, several applications thereof are illustrated in FIGURES 26 and 27 wherein the valve constructions are adapted to provide flow control means for domestic washing machines or the like.

In particular, a system of this invention is generally indicated by the reference numeral 288 in FIGURE 26 wherein a valve construction 289 of this invention has an adjustable reading head 290 provided with a lever arm 291 and has an adjustable valve member 292 provided with a lever arm 293.

The lever arm 293 of the movable valve member 292 is interconnected to a diaphragm 294 by a lever 295, the diaphragm 294 dividing a casing or housing 296 into two chambers 297 and 298.

A spring 299 normally tends to move the diaphragm 294 downwardly in opposition to the trapped air in the chamber 298.

Another valve construction 300 is provided in the system 288 and comprises a fixed reading head 301 and a movable valve member 302 provided with a lever arm 303.

The reading head 301 of the valve construction 300 is provided with a passage means 304 leading to the cold side of a mixer valve or the like, a passage means 305 leading to the hot side of the mixer valve or the like, and a passage means 306 leading to a passage means 307 in the reading head 290 of the valve construction 289.

The reading head 290 of the valve construction 289 includes a passage means 308 leading to a vacuum source.

The valve member 302 of the valve construction 300 has a blister portion 309 and a pair of apertures 310 and 311 passing therethrough, the blister 309 being adapted to interconnect the passage means 306 to both of the mixer valve passage means 304 and 305 when the lever arm 303 is disposed in the medium position thereof.

However, when the lever arm 303 of the valve member 302 is moved to the cold position, the passage means 306 is only connected to the cold side of the mixer valve by the passage means 304 while the aperture 311 registers with the passage means 305 leading to the hot side of mixer.

Conversely, when the lever arm 303 of the valve member 302 is moved to the hot position thereof the passage means 306 is only interconnected to the passage means 305 leading to the hot side of the mixer valve while the aperture 310 registers with the passage means 304 leading to the cold side of the mixer valve.

The valve member 292 of the valve construction 289 has a blister portion 312 and an aperture 313.

The reading head 290 of the valve construction 289 can be adjusted to any position thereof by the lever arm 291 to select a desired level of water in the domestic washing machine or the like.

Thereafter, the diaphragm 294 controls the valve member 292 of the valve construction 289 to cause the blister portion 312 thereof to bridge the passage means 307 and 308 as long as there is a demand for water in the washing machine whereby the vacuum source is interconnected to either the cold side or hot side or both of the mixer valve depending upon the position of the valve member 302 of the valve construction 300.

However, when the level of water in the washing machine has reached the desired level as set by the reading head 290, the lever arm 293 of the valve member 292 is moved relative to the reading head 290 to terminate communication between the vacuum source 308 and the passage means 307 leading to the mixer valve while the aperture 313 of the valve member 292 is disposed in register with the passage 307 to permit air to return to the vacuum chamber of the mixing valve and render the same inoperative.

Therefore, it can be seen that the valve constructions of this invention can be so mounted relative to an instrument panel of a domestic washing machine or the like whereby the lever arms 303 and 291 are adapted to project through the instrument panel and be manually moved to the desired positions for a desired washing cycle, the lever arm 303 controlling the temperature of the water and the lever arm 291 controlling the water level in the washing machine.

Another system of this invention is generally indicated by the reference numeral 314 in FIGURE 27 and comprises a pair of valve constructions 315 and 316 of this invention.

The valve construction 315 includes a fixed reading head 317 and a movable valve member 318 provided with a lever arm 319, the reading head 317 having a passage means 320 leading to a water mixing valve and three passage means 321, 322 and 323 respectively leading to passage means 324, 325 and 326 of the reading head 327 of the valve construction 316 for a purpose hereinafter described.

The movable valve member 318 of the valve construction 315 has a blister portion 328 adapted to selectively bridge the spacing between the passage means 320 and one of the passage means 321, 322 and 323 of the reading head 317 for a purpose hereinafter described.

The valve construction 316 has the reading head 327 thereof provided with an elongated passage means 329 leading to a vacuum source.

The valve construction 316 includes a movable valve member 330 interconnected to a diaphragm 331 by an adjustable rod 332, the diaphragm 331 dividing a casing 333 into two chambers 334 and 335 in a manner similar to the diaphragm 294 previously described.

The valve member 330 of the valve construction 316 includes a plurality of blister portions 336, 337 and 338 adapted to respectively bridge the spacing between the passage means 329 and passage means 324, 325 and 326 of the reading head 327 for a purpose hereinafter described.

The valve member 330 includes vent apertures 339, 340 and 341.

When it is desired to select the amount of water to be fed to a domestic washing machine, the lever arm 319 of the valve member 318 of the valve construction 315 is moved to the desired position.

For example, when the lever arm 319 is moved to the "seven gallon" position thereof, the blister portion 328 of the valve member 318 interconnects the passage means 320 with the passage means 321 leading to the passage means 324 in the reading head 327 of the valve construction 316.

Thereafter, as long as the diaphragm 331 is disposed in a water demand position, the blister portion 336 of the valve member 330 of the valve construction 316 continually interconnects the vacuum source to the water valve by interconnecting the passage means 324 and 329 of the reading head 327 whereby water enters the domestic washing machine or the like.

When the amount of water in the domestic washing machine reaches seven gallons, the diaphragm 331 is moved upwardly to move the valve member 330 relative to the reading head 327 whereby the blister portion 336 no longer interconnects the passage means 324 and 329 and the aperture 339 of the valve member 330 is disposed in register with the passage means 324 to permit air to return to the mixer valve of the washing machine to terminate operation thereof.

Therefore, it can be seen that by merely adjusting the lever 319 of the valve construction 315 to either the "seven gallon," "eleven gallon" or "fifteen gallon" position thereof, the valve constructions 315 and 316 cooperate together to permit the mixer valve to supply the proper amount of water to a domestic washing machine or the like.

The various valve constructions of the systems 288 and 314 of this invention described above and illustrated perspectively in FIGURES 26 and 27 can be formed in any of the manners of the various valve constructions of this invention previously described whereby the valve constructions of the systems 288 and 314 incorporate the various features of this invention.

Referring now to FIGURES 28–30, an improved electrical switch construction of this invention is generally indicated by the reference numeral 342 and comprises a casing 343 formed from a tubular member 344 having the opposed ends thereof closed by end caps 345 and 346 in any suitable manner, the end cap 345 being formed of electrically insulating material.

The end caps 345 and 346 are respectively provided with passage means 347 and 348 leading into a compartment 349 defined in the casing 343.

A pair of terminals 350 respectively lead from the exterior of the casing 343 through the end cap 345 into the compartment 349 of the casing 343, the terminals 350 respectively being interconnected to resilient switch arms 351 normally biased toward each other.

The switch arms 351 respectively carry switch contacts 352 normally disposed in contact with each other to complete a circuit between the terminals 350 for any desired purpose.

A pair of non-conductive arms 353 are respectively interconnected to the terminals 350 and extend away therefrom, the arms 353 respectively being interconnected at the free ends 354 thereof to non-conductive plates 355 having the free ends 356 thereof disposed in engagement with the switch arms 351 as illustrated in FIGURES 28 and 29.

A flexible member 357 is disposed in the compartment 349 and is secured between the tubular member 344 and the end cap 346 to divide the compartment 349 into two chambers 358 and 359, the chamber 358 being in communication with passage means 348 and the chamber 359 being in communication with the passage means 347 previously described.

As long as the pressure differential between the chambers 358 and 359 is substantially zero or the chamber 359 has a greater pressure than the chamber 358, the bag-like, flexible member 357 is disposed in the position illustrated in FIGURE 28 whereby the switch contacts 352 are disposed in contact with each other and permit electrical current to flow between the terminals 350 for any desired purpose.

However, when the pressure differential between the chambers 358 and 359 reaches a point whereby the flexible member 357 expands and engages the pressure members 355 to move the same outwardly and carry the switch arms 351 away from each other in the manner illustrated in FIGURE 29, the electrical current between the terminals 350 is terminated until the flexible member 357 collapses to the position illustrated in FIGURE 28.

One typical application of the switch construction 342 of this invention is to provide a water level control for a domestic washing machine or the like wherein the passage means 348 thereof is interconnected to a water level sensing means so that the air trapped in the chamber 358 will increase as the water level in the domestic washing machine increases.

Therefore, as long as the supply of water to the washing machine is below the desired level thereof, the switch contacts 352 remain in contact with each other and energize a suitable solenoid valve or the like to supply water to the washing machine.

However, when the water level has reached the desired level, the flexible member 357 is expanded to the position illustrated in FIGURE 29 to open the switch contact 352 and terminate operation of the flow of water to the washing machine.

While the flexible member 357 of the switch construction 342 has been illustrated as being bag-like, it is to be understood that the same can be formed in any desired manner.

For example, another switch construction of this invention is generally indicated by the reference numeral 360 in FIGURES 31 and 32 wherein parts thereof similar to the switch construction 342 are indicated by like reference numerals.

The end cap 345 of the switch construction 360 is provided with an upwardly extending portion 361 having annular flanges 362 and 363 disposed at the opposed ends thereof.

A tubular flexible member 364 is adapted to encompass the annular flanges 362 and 363 of the end cap 346 to define a chamber 365 therewith, the tubular flexible member 364 being secured to the annular flanges 362 and 363 by split retaining rings 366.

The chamber 365 of the flexible member 364 is interconnected to a pasasge means 367 formed in the end cap 346 while the other chamber 359 of the casing 343 is interconnected to passage means 347 formed in the end cap 345.

As long as the pressure differential between the chambers 365 and 359 remains substantially zero, the switch contacts 352 are disposed in contact with each other whereby current can flow between the terminals 350.

However, when the pressure in the chamber 365 increases over the pressure in the chamber 359 to an amount greater than the spring force of the switch arms 351, the expanded flexible member 364 moves the switch arms 351 away from each other to break electrical contact between the switch contacts 352 to terminate the flow of current between the terminals 350 in a manner similar to the switch construction 352 previously described.

Therefore, it can be seen that this invention also provides improved electrical switch constructions or the like which can be actuated by a simple pressure differential arrangement.

While the form of the invention now preferred has been disclosed as required by the statutes, other forms may be used, all coming within the scope of the claims which follow.

What is claimed is:

1. A control device comprising a casing, said casing having a reading head, said reading head having a reading surface interrupted by a plurality of passage means, a backing member disposed in said casing and movable relative to said reading surface, a flexible sheet disposed in sliding engagement with said reading surface, said sheet having a blister portion providing a channel adapted to interconnect said passage means when said sheet is in one position thereof, said sheet being operatively interconnected to said backing member to move in unison therewith, a flexible member disposed between said sheet and said backing member and being under compression to urge said sheet into sealing relation with said reading surface, and a movable member carried by said casing and being adapted to engage and move said backing member relative to said reading surface, said movable member having a lost motion connection with said backing member whereby said movable member initially moves relative to said backing member before moving said valve member upon further movement of said movable member.

2. A control device as set forth in claim 1 wherein a spring is disposed between said backing member and said movable member to place said flexible member under compression.

3. A control device as set forth in claim 1 wherein snap acting means are interconnected to said movable member to move said movable member.

(References on following page)

References Cited by the Examiner

UNITED STATES PATENTS

| | | | |
|---|---|---|---|
| 1,493,781 | 5/1924 | Kennedy | 251—75 X |
| 2,075,959 | 4/1937 | Previti | 251—75 |
| 2,121,433 | 6/1938 | Kettunen | 251—75 X |
| 2,254,673 | 9/1941 | Barbat | 200—83.2 |
| 2,530,622 | 11/1950 | Maris | 137—624.15 |
| 2,685,007 | 7/1954 | Fischer | 200—67 |
| 2,798,689 | 7/1957 | Houghton | 251—75 |
| 2,816,729 | 12/1957 | Jensen | 251—75 |
| 2,825,780 | 3/1958 | Beller et al. | 200—67 |
| 2,946,321 | 7/1960 | Lieser | 137—625.66 |
| 3,030,778 | 4/1962 | Taylor | 137—625.66 X |
| 3,082,791 | 3/1963 | Miller | 137—625.2 |
| 3,091,676 | 5/1963 | Koster | 200—83 |
| 3,122,616 | 2/1964 | Rice et al. | 137—625.46 X |

M. CARY NELSON, *Primary Examiner.*

BERNARD A. GILHEANY, HENRY T. KLINKSIEK, *Examiners.*